(12) United States Patent
Salas et al.

(10) Patent No.: US 12,534,026 B2
(45) Date of Patent: Jan. 27, 2026

(54) BACKLIT BODYWORK ELEMENT INCLUDING A CHROME LAYER

(71) Applicant: PO Lighting Czech, s.r.o., Senov u Noveho Jicina (CZ)

(72) Inventors: Mario Salas, Senov u Noveho Jicina (CZ); Stephen Morris, Northville, MI (US)

(73) Assignee: PO Lighting Czech, s.r.o., Senov u Noveho Jicina (CZ)

( * ) Notice: Subject to any disclaimer, the term of this patent is extended or adjusted under 35 U.S.C. 154(b) by 0 days.

(21) Appl. No.: 18/981,586

(22) Filed: Dec. 15, 2024

(65) Prior Publication Data

US 2025/0214517 A1   Jul. 3, 2025

(30) Foreign Application Priority Data

Dec. 29, 2023 (EP) ..................................... 23220847

(51) Int. Cl.
*B60R 13/00* (2006.01)
*B60Q 1/26* (2006.01)

(52) U.S. Cl.
CPC .............. *B60R 13/005* (2013.01); *B60Q 1/26* (2013.01)

(58) Field of Classification Search
CPC ........... F21S 43/401; F21S 43/40; F21S 43/33
See application file for complete search history.

(56) References Cited

U.S. PATENT DOCUMENTS

| | | | |
|---|---|---|---|
| 10,520,159 B1* | 12/2019 | Tsai | F21S 43/33 |
| 2004/0216406 A1* | 11/2004 | Egashira | B32B 5/14 52/311.1 |
| 2012/0313392 A1 | 12/2012 | Bingle | |
| 2013/0329444 A1* | 12/2013 | Oh | F21S 43/195 362/543 |
| 2014/0240999 A1* | 8/2014 | Roberts | G09F 13/06 362/510 |
| 2014/0247614 A1* | 9/2014 | Roberts | G09F 13/08 362/509 |
| 2022/0065422 A1* | 3/2022 | Caruso | F21S 43/239 |
| 2022/0161293 A1 | 5/2022 | Graham et al. | |

FOREIGN PATENT DOCUMENTS

CN            217821996 U        11/2022

\* cited by examiner

*Primary Examiner* — Eric T Eide

(57) ABSTRACT

A motor vehicle bodywork element comprising a body made of a transparent material comprising an internal face and an external face and a light source placed behind the internal face of the body, wherein the internal face is covered by a layer of metal deposit, said layer of metal deposit being covered by a layer of an opaque material, both layers being etched so as to form a pattern visible from the external face of the body, wherein the layer of opaque material is a second layer of metal deposit darker than the metal of the first layer.

11 Claims, 5 Drawing Sheets

BACKLIT BODYWORK ELEMENT INCLUDING A CHROME LAYER

FIELD OF THE INVENTION

The invention relates to the domain of bodywork elements for motor vehicles. More particularly, it relates to a styling part placed in a visible manner on a support of the vehicle to contribute to the exterior general appearance of the vehicle.

BACKGROUND OF THE INVENTION

The purpose of these styling parts or bodywork elements is to emphasize a line or highlight a shape with the aim of reinforcing the image that the manufacturer desires to associate with its brand or with its vehicle model.

By way of example, the logo of the brand, the metal strips that run along the sides of the vehicle, the protectors of body sills, the trims of door handles, and the wing-mirror covers are all styling parts the design of which is subject to particular care and attention on the part of the designers of the vehicle. By extension, all the parts of the bodywork that may be seen from the exterior and that participate in the general appearance of the vehicle, such as a door, a bumper, a grille, etc. may also be considered to be bodywork elements or styling parts that fall within the scope of application of the invention.

In particular, styling parts comprising the logo of the brand are placed on the front hood of a motor vehicle. In order to make the logo visible, an internal side of the bodywork element, which is formed from a transparent material, comprises a metallized coating than can be clearly distinguished from the background on which it is placed, i.e., the front hood of the motor vehicle which is painted some other color. A layer of opaque paint is lain over the metallized coating so as to form a pattern such as a logo specific to the brand of the manufacturer.

With the aim of reinforcing the aesthetic effect produced by these styling part, it has been proposed to place a light source behind the surface of the bodywork element, and to apply a layer of opaque paint on its internal surface, so as to make a luminous effect appear when the external lighting conditions are insufficient and the light source is activated. To that end, zones of the body are not coated by paint so as to form a pattern, which can also be a logo specific to the brand of the manufacturer.

Thus, when the vehicle is illuminated by daylight, the optical device is turned off and the appearance of the bodywork element is defined by the metallized coating of the bodywork element. When the lighting conditions decrease, the optical device is turned on and the appearance of the body work is defined by the light going through the zones of the body that are not covered by the opaque paint.

However, such a bodywork element has several drawbacks. First, the process of painting the metallized coating can be made difficult considering the small thickness of the body, which for some parts such as logos can be as low as a few millimeters. As applying the paint can involve splashes, the process requires careful masking of the body to obtain an aesthetically pleasing pattern, which requires time and precision, thus increasing the bodywork's manufacturing costs. Also, such paints usually use chemicals like solvents which cause cracks into the bodywork, in particular the plastic part of the bodywork. Secondly, the metallized layer, which is usually aluminium deposited by physical vapour deposition (PVD), may comprise very small pinholes, that is imperfections, through which the light can go through. Moreover, the paint finish on such a metallized layer has a tendency to accentuate the presence of these pinholes. This creates a so-called "stardust effect" which alters the pattern rendition when the light source is activated by introducing parasitic light. Double layered aluminium has been used, sometimes even in combination with paint, but such a double layer fails to deliver satisfactory results as the "stardust effect" remains.

SUMMARY OF THE INVENTION

The purpose of the invention is to avoid the aforementioned drawbacks.

The motor vehicle bodywork element according to the invention comprises a body made of a transparent material comprising an internal face and an external face and a light source placed behind the internal face of the body, wherein the internal face is covered by first a layer of metal deposit, said first layer of metal deposit being covered by a layer of an opaque material, both layers being etched so as to form a pattern visible from the external face of the body, wherein the layer of opaque material is a second layer of metal deposit darker than the metal of the first layer.

Hence, the bodywork element comprises a transparent body provided with covered zones formed by the two layers and uncovered transparent zones defined between etched layers, together defining a particular pattern, for example a logo. The first layer of metal deposit contributes to a shiny or glossy reflection of the bodywork, in particular in daylight conditions when light is reflected on the external face. The second layer of an opaque material is configured to block passage of light rays through the covered zones when the light source is activated. In other terms, the second layer of opaque material ensures ideal rendition of the bodywork element pattern from the external face by allowing light rays emitted by the light source to pass only through the transparent uncovered zones.

Here, the layer of opaque material is a second layer of metal deposit darker than the metal of the first layer in order to eliminate any "stardust effect". Indeed, contrary to prior-art documents, here two metallized layers are used to prevent the use of paint, which has a tendency of accentuating pinholes formed when the first layer of metal deposit is lain on the bodywork element. The second metallized layer also ensures a shinier and glossier finish in daylight. Furthermore, the second layer of metal deposit consists of a different metal as compared to the first layer. The metal of the second layer is advantageously darker than the metal of the first layer to increase the opacity of the covered zones so as to efficiently prevent, even block, light rays emitted from the light source from passing through the covered zones in low-light conditions.

Preferably, the metal of the first layer is aluminium, or an alloy mainly constituted of aluminium. Indeed, aluminium is a metal that can easily be applied as a layer using different deposition techniques and provides a color and sheen that are aesthetically pleasing.

In the present description, what is meant by "alloy mainly constituted of aluminium" is an alloy comprising more than 50% aluminium in mass.

Most preferably, the metal of the second layer is chrome, or an alloy mainly constituted of chrome. Indeed, chrome is a metal that can easily be applied as a layer using different deposition techniques and is darker and more opaque than other metals such as aluminium.

In the present description, what is meant by "alloy mainly constituted of chrome" is an alloy comprising more than 50% chrome in mass.

Advantageously, the metal of the first layer is lain on the internal face of the body by sputtering. This technique allows for a homogenous coating which reduces the risk of having pinholes in the metal layer.

Preferably the metal of the second layer is lain on the first layer by sputtering. This allows for applying the first and second layers in a sequential manner using the same apparatus, thus reducing manufacturing costs.

According to a preferred example, the body is formed using an amorphous material, preferably polycarbonate (PC), polymethyl methacrylate (PMMA) or a combination of the two.

Preferably, the external face of the body is covered by a layer of hard coat. This heavily limits the risks of scratching and in general, damaging the body surface. Preferably, the hard coat is formed by a UV-curable material, such as a polymer, for example polycarbonate. Preferably, such a material comprises a photo initiator which is deposited on the body, and applying UV rays causes polymerization of the material in order to obtain the hard coat imparting physical properties such as hardness, gloss, abrasion resistance and adhesive strength.

According to a preferred example, the etching of the layers is obtained by laser etching. Laser etching is a reliable and precise way of obtaining the required pattern.

The invention is also directed to a motor vehicle comprising a bodywork element according to the invention.

The invention is also directed to a method for manufacturing a motor vehicle bodywork element comprising the following steps:
  providing a body made of a transparent material comprising an internal face and an external face,
  covering the internal face by a layer of metal deposit,
  covering the layer of metal deposit by a layer of an opaque material which is a second layer of metal deposit,
  laser etching the first and second layers so as to form a pattern visible from the external face of the body, and
  providing a light source placed behind the internal face of the body.

BRIEF DESCRIPTION OF THE DRAWINGS

The invention will be better understood in light of the figures, which serve to support the present description, and in which.

DETAILED DESCRIPTION OF THE INVENTION

A motor vehicle bodywork element 10 will be described with reference FIGS. 1 to 5b. Such a bodywork element 10 is especially appreciated for contributing to the exterior general appearance of the vehicle 1. More particularly, the bodywork element 10 is configured to eliminate "stardust effect".

Figure 1:
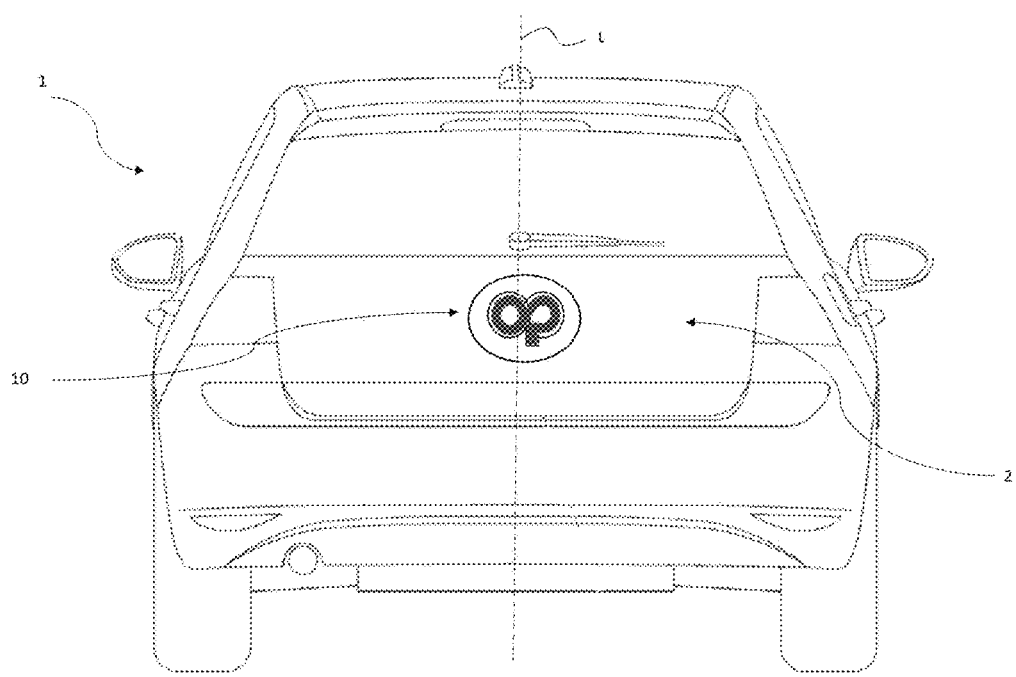
FIG. 1 shows a schematic diagram of a motor vehicle with a bodywork element according to the present invention.

FIG. 1 shows a motor vehicle 1 comprising a bodywork element 10 mounted on a trunk lid support 2 of the motor vehicle 1. The bodywork element 10 can of course be placed elsewhere, for example on the front side of the motor vehicle 1. As it can be seen, the bodywork element 10 defines a specific logo of a specific brand.

Figure 2:
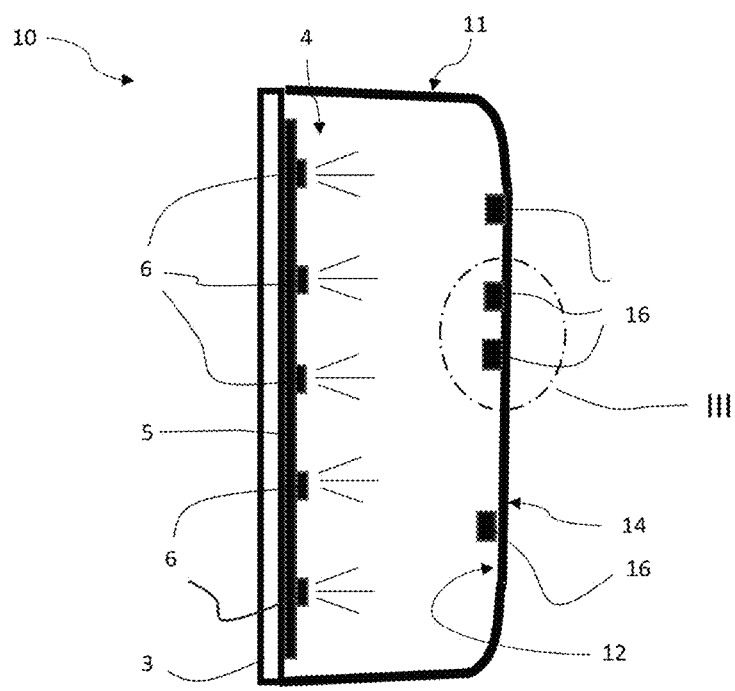
FIG. 2 is a schematic longitudinal section side view of a bodywork element according to an embodiment of the present invention

Referring to FIG. 2, a sectional side view of the bodywork element 10 isolated from the motor vehicle 1, is schematically represented. The section is made along a longitudinal axis L of the motor vehicle 1 seen in FIG. 1. The bodywork element 10 comprises a body 11 comprising an internal face 12 facing the inside of the motor vehicle 1 and an external face 14 facing the outside of the motor vehicle 1. Herein, the bodywork element 10 is mounted on a backcover support 3 placed behind the internal face 12, such that the backcover support 3 and the internal face 12 are mutually opposed. In other terms, the backcover support is placed towards the inside of the motor vehicle 1 as compared to the internal face 12 or the body 11.

The backcover support 3 is configured to facilitate the installation of the bodywork element 10 on the support 2 of the vehicle 1, notably with the help of known fixing means. Furthermore, the backcover support 3 is equipped with a light source 4, more precisely including a plate 5 provided with multiple light-emitting diodes (LEDs) 6. The light source 4 is preferably controlled by a central computer (not represented) of the vehicle 1 defining a particular daytime design of the bodywork element 10 and a particular night-time, or low-light design of said bodywork element 10. This feature will be explained in the following paragraphs.

The body 11 is advantageously made of a transparent material to allow light to pass through, especially light emitted by the light source 4. In particular, the body 11 is formed using an amorphous material, preferably polycarbonate (PC), polymethyl methacrylate (PMMA) or a combination of the two. The internal face 12 comprises covered zones 16 which define the pattern of the logo.

Figure 3:
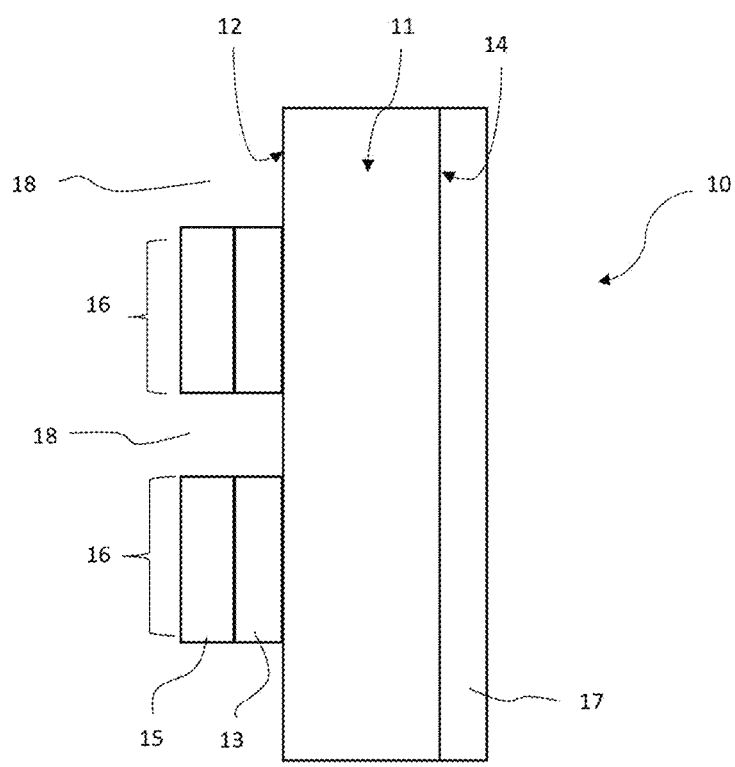
FIG. 3 shows a zoomed portion of the bodywork element from FIG. 2.

Referring to FIG. 3 showing zoomed on a portion of the bodywork element 10 of FIG. 2, the external face 14 of the body 11 is covered by a layer of hard coat 17 which heavily limits the risks of scratching and in general, damaging the body 11 external face 14.

The internal face 12 is covered by a first layer 13 of metal deposit, said first layer 13 being covered by a second layer 15 of opaque material. Preferably, both layers 13, 15 are etched, notably by laser etching, so as to form a pattern visible from the external face 14 of the body 11. Hence, the etching defines the covered zones 16 seen on FIG. 2, as well as uncovered zones 18 between these covered zones 16. In particular, each of the covered zones 16 comprise the first layer 13 of metal deposit and second layer 15 of opaque material while the uncovered zones 18 are composed of portions of the transparent body 11 uncovered following the laser etching.

In daylight, when the light source 4 is maintained off, light reflects on the external face 14 such that the covered zones 16 define the logo in a daylight design. More precisely, light reflects the first layer 13 of metal deposit through the transparent body 11. In night-time, or low-light conditions, the light source 4 is turned on, and light rays pass through the transparent uncovered zones 18 to define a night-time design of the logo. The light source 4 can be imagined emitting different light colors to create a desired aesthetic effect.

Preferably, the metal of the first layer 13 is aluminium or an alloy constituted of aluminium. Indeed, due to its light-reflecting properties, aluminium allows an efficient reflection of light, especially during daylight when the covered zones 16 define the logo. Moreover, aluminium, particularly an aluminium alloy, provides good corrosion resistance which ensures the durability of bodywork element 10 especially since it is exposed to different weather conditions and moisture.

Most preferably, the metal of the second layer 15 is chrome, or an alloy mainly constituted of chrome. Chrome is darker and more opaque than aluminium. When the chrome second layer 15 is lain or superposed on the aluminium first layer 13, the second layer 15 ensures a shiny metal coating for better reflective properties during daylight, notably in the daytime design, and also its opacity effectively blocks the passing of light, in particular when the light source 4 is activated. Hence, even if the process of applying the aluminium first layer 13 leaves some pinholes, that is imperfections, the chrome second layer 15 efficiently prevents light from passing through those pinholes when the light source 4 is activated, so as to eliminate a "stardust effect".

Figure 4:
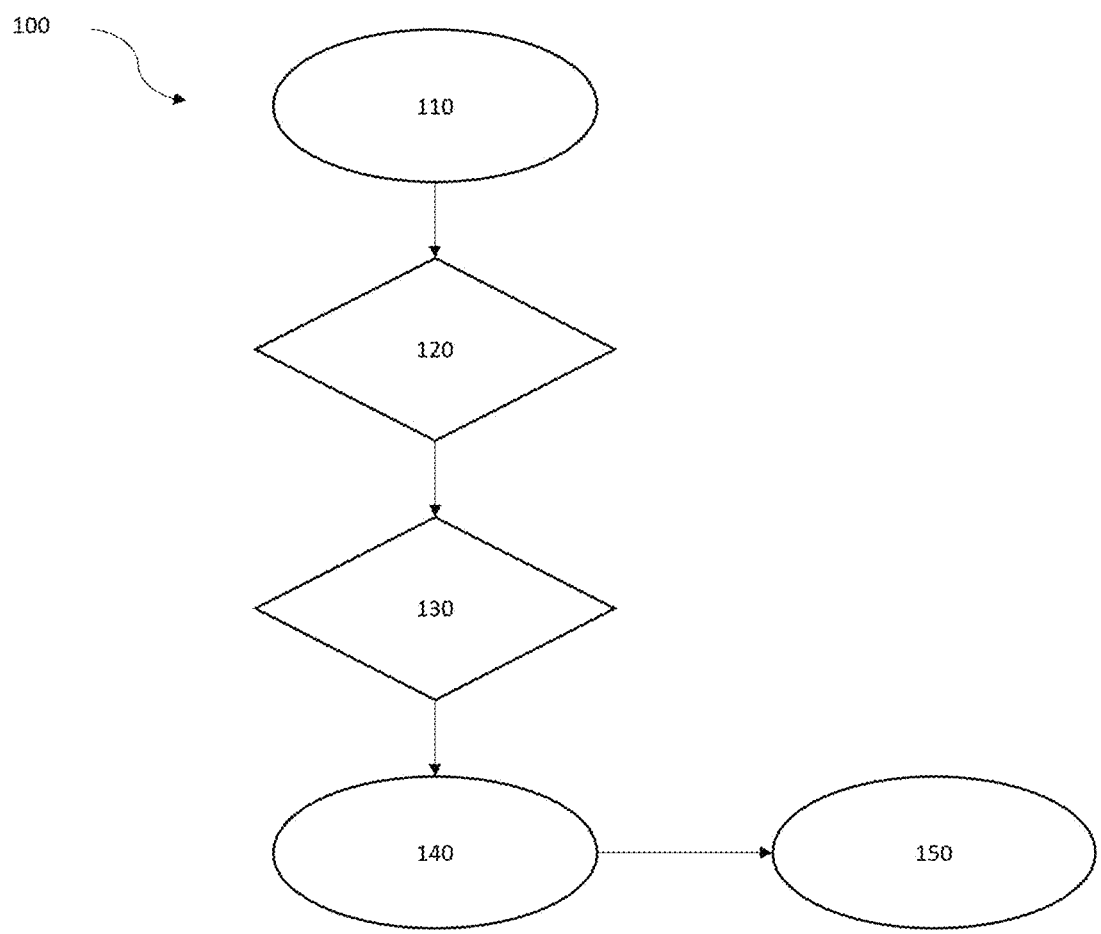
FIG. 4 is a flow diagram of a method for manufacturing a motor vehicle bodywork according to the present invention.

FIG. 4 shows a flow diagram of a method 100 for manufacturing a motor vehicle bodywork element 10. The method comprises the following steps:

providing 110 a body 11 made of a transparent material comprising an internal face 12 and an external face 14, covering 120 the internal face 12 by a layer 13 of metal deposit, covering 130 the layer 13 of metal deposit by a layer 15 of an opaque material which is a second layer of metal deposit, laser etching 140 the first 13 and second 15 layers so as to form a pattern visible from the external face 14 of the body 11, and providing 150 a light source 4 placed behind the internal face 12 of the body 11.

Advantageously, the metal of the first layer 13 is lain on the internal face 12 of the body by sputtering. This technique allows for a homogenous coating which reduces the risk of having pinholes in the first layer 13.

Preferably the metal of the second layer 15 is lain on the first layer 13 by sputtering. This allows for applying the first 13 and second 15 layers in a sequential manner using the same apparatus, thus reducing manufacturing costs.

Figure 5A:
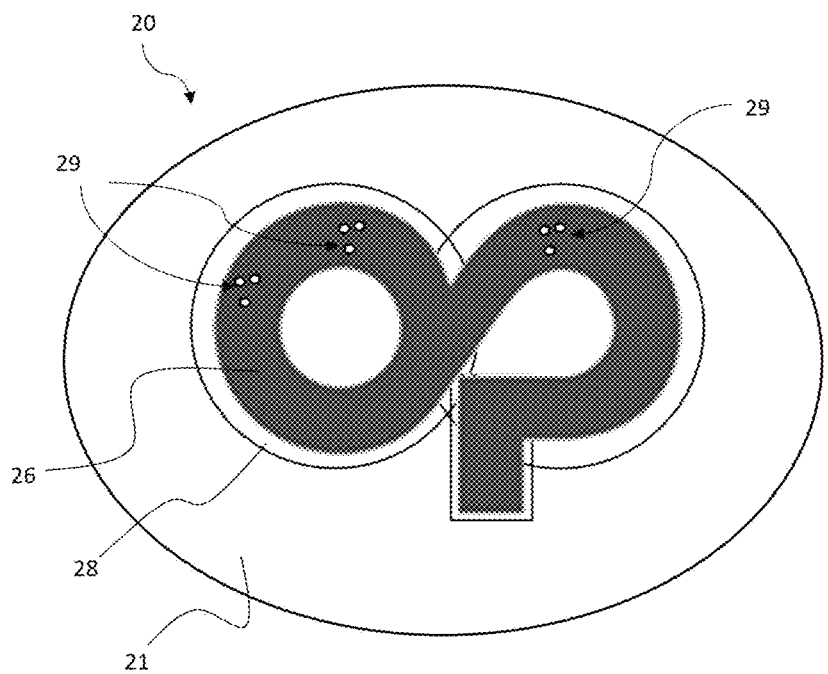
FIG. 5a shows a schematic frontal view of a bodywork element comprising "stardust effect" according to the prior-art.
Figure 5B:
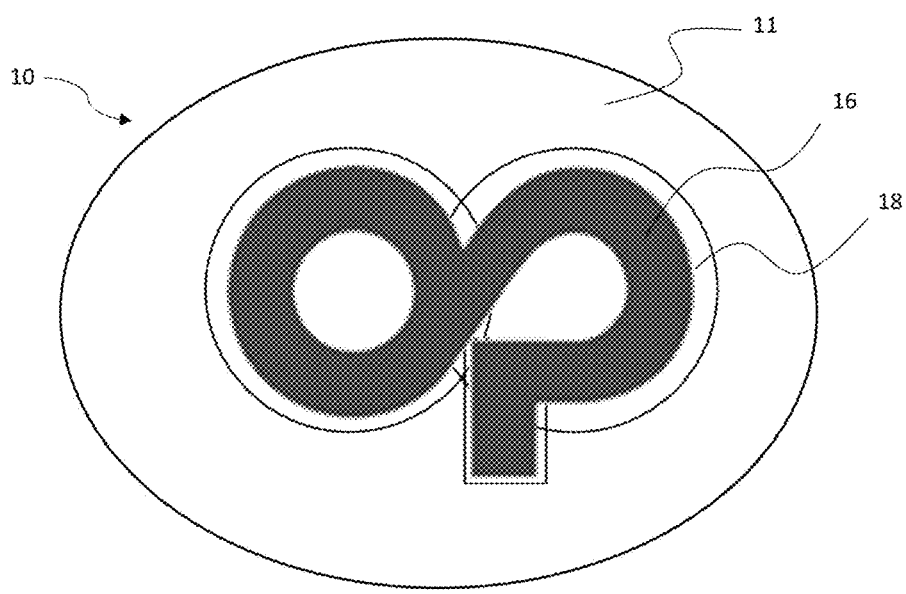
FIG. 5b shows a schematic frontal view of a body element according to the present invention, free of any "stardust effect".

With reference to FIGS. 5a and 5b, a frontal view of a prior art bodywork element 20 (FIG. 5a) is represented for comparison with an embodiment of the bodywork element 10 (FIG. 5b) according to the invention. On FIG. 5a, the bodywork element 20 comprises a body 21 comprising transparent uncovered zones 28 and layered covered zones 26 which further comprise pinholes 29, or imperfections. Thus, during night-time or low-light conditions, when the light source 4 is activated, light rays inevitably pass through the pinholes 29 and degrade the general desired appearance of the logo. In contrast, thanks to the proposed invention, the opacity of the second layer 15 of opaque material on the layered covered zones 16 efficiently covers possible pinholes, making them invisible in the general appearance of the logo and admits passage of light rays exclusively through the transparent uncovered zones 18 when the bodywork element 10 is backlit.

REFERENCES LIST

L: longitudinal axis of motor vehicle
1: motor vehicle
2: vehicle trunk lid support
3: backcover support
4: light source
5: plate
6: light-emitting diodes
10: bodywork element
11: body
12: internal face
13: first layer of metal deposit
14: external face
15: layer of opaque material
16: covered zones
17: hard coat
18: uncovered zones
20: (prior-art) bodywork element
21: (prior-art) body
26: (prior-art) covered zones
28: (prior-art) uncovered zones
29: pinholes
100: method for manufacturing a motor vehicle bodywork element
110: providing a body made of a transparent material
120: covering the internal face by a layer of metal deposit
130: covering the layer of metal deposit by a layer of an opaque material
140: laser etching the first and second layers so as to form a pattern
150: providing a light source placed behind the internal face of the body

The invention claimed is:

1. A motor vehicle bodywork element (10) comprising a body (11) made of a transparent material comprising an internal face (12) and an external face (14) and a light source (4) placed behind the internal face (12) of the body (11), wherein the internal face (12) is covered by a first layer of metal deposit (13), said first layer of metal deposit being covered by a layer of an opaque material (15), both layers being etched so as to form a pattern visible from the external face (14) of the body (11), wherein the layer of opaque material (15) is a second layer of metal deposit darker than the metal of the first layer (13).

2. The bodywork element (10) according to claim 1, wherein the metal of the first layer (13) is aluminium, or an alloy mainly constituted of aluminium.

3. The bodywork element (10) according to claim 2, wherein the metal of the second layer (15) is chrome, or an alloy mainly constituted of chrome.

4. The bodywork element (10) according to claim 1, wherein the metal of the second layer (15) is directly lain on the metal of the first layer.

5. The bodywork element (10) according to claim 1, wherein the metal of the first layer (13) is lain on the internal face (12) of the body (11) by sputtering.

6. The bodywork element (10) according to claim 1, wherein the metal of the second layer (15) is lain on the first layer (15) by sputtering.

7. The bodywork element (10) according to claim 1, wherein the body (11) is formed using an amorphous material, preferably polycarbonate, polymethyl methacrylate or a combination of the two.

8. The bodywork element (10) according to claim 1, wherein the external face (14) of the body (11) is covered by a layer of hard coat.

9. The bodywork element (10) according to claim 1, wherein the etching of the layers (13, 15) is obtained by laser etching.

10. A motor vehicle (1) comprising a bodywork element (10) according to claim 1.

11. A method (100) for manufacturing a motor vehicle bodywork element (10) comprising the following steps:

- providing (110) a body made of a transparent material comprising an internal face and an external face,
- covering (120) the internal face by a layer of metal deposit,
- covering (130) the layer of metal deposit by a layer of an opaque material which is a second layer of metal deposit, wherein the second layer of metal deposit is darker than the metal of the first layer of metal deposit,
- laser etching (140) the first and second layers so as to form a pattern visible from the external face of the body, and
- providing (150) a light source placed behind the internal face of the body.

* * * * *